Patented Sept. 17, 1929

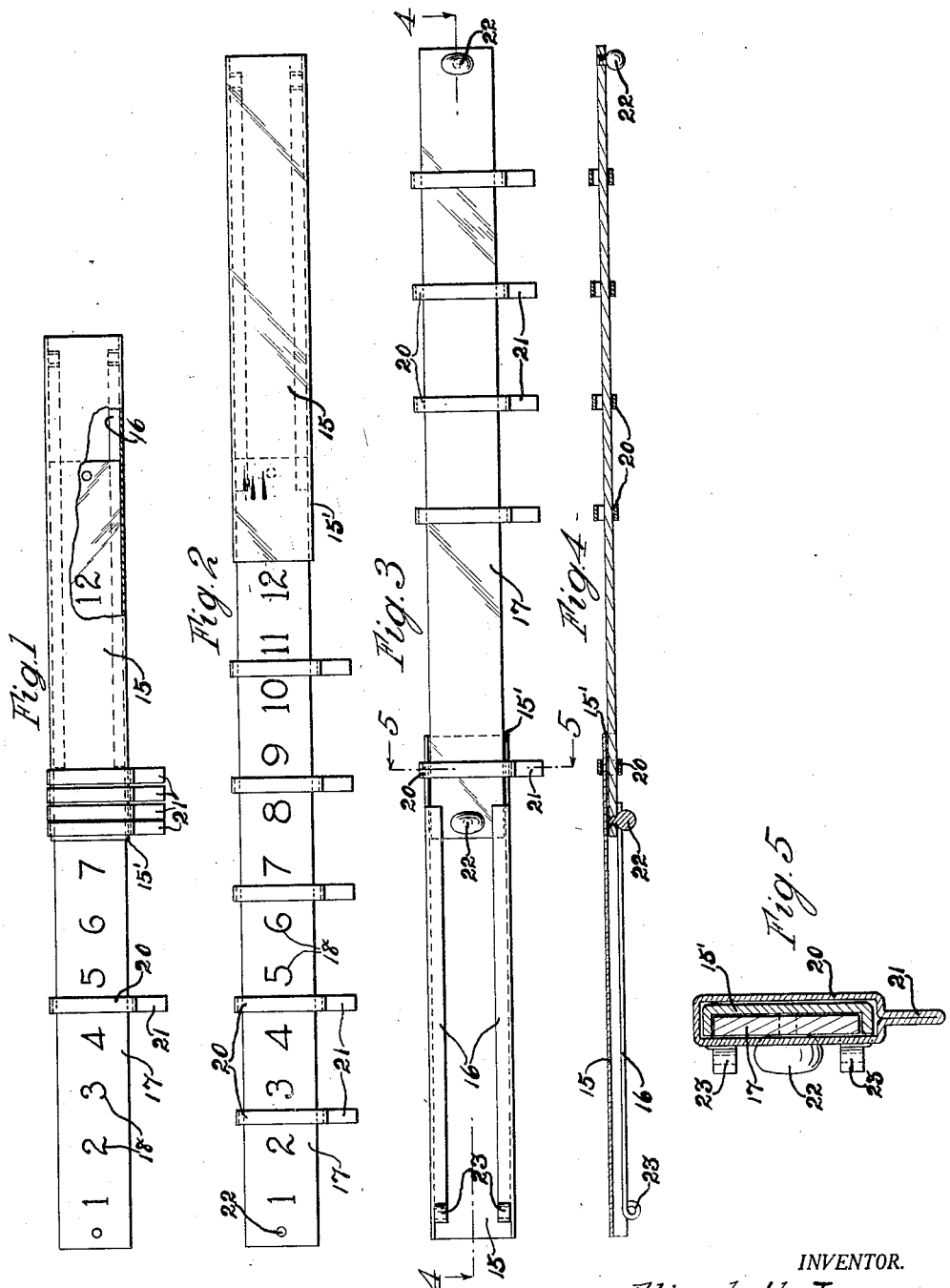

1,728,491

UNITED STATES PATENT OFFICE

ELIZABETH JANNESON, OF CHICAGO, ILLINOIS

NUMBER-LEARNING DEVICE

Application filed June 3, 1927. Serial No. 196,374.

This invention relates to a number-learning device, and more particularly to a device including means for aiding the children in readily learning number facts and number processes in their early school years.

The main object of my invention is to provide a device including means for aiding small children and making it comparatively easy for them to learn the number processes and number facts in their early school years, by dealing with things and numbers which they can see, and of which they can be kept conscious, while learning the numbers and the grouping thereof and the particular positions of these numbers in the scale of consecutive numbers.

During my years of teaching in the Chicago schools it has become apparent to me, that in the early school years of the young child, the learning of numbers is a conscious process; and is not the same as the process which takes place in the mind of the more advanced child or the adult when computing numbers, after having well learned the number facts which show the various groupings of numbers.

I have found that the child at the beginning develops a number concept, at first forming its concept of one, then of two, then three, etc., proceeding upward number by number. This concept is at first and best formed by the observation and counting of objects; whereafter the child forms its number concept by the total amount of names of the successive numbers which it must call into consciousness in order to reach a certain number. Its concept of ten is formed by having repeatedly called into consciousness ten names of the first ten numbers in the number scale in order to reach ten. It next acquires a number sense or power of being able to realize the number of objects in a group; and finally learns the grouping of numbers, or number facts, as by observing that four and three are seven, or that ten tens are one hundred.

It is now evident to me that the process of learning the various number facts is in a large measure that of learning the position of each number in the number scale relative to that of every other number. Thus seven is three places above four in the number scale, twelve is two places above ten, etc. In this process the child becomes conscious of the numbers from four to seven, in counting them, and sees that seven is three numbers above four in the number scale, and after this process has been repeated many times it becomes well known to the child, after a few years, and is said to have become subconscious.

It is through my past observation of the above outlined processes that it has become possible for me to form a system for leading the young children into a learning of numbers such that their work is a matter of dealing with things,—things which they can see,—and of which they can be kept conscious, while dealing with those things, and of the numbers represented by them when forming the different groups and combinations of groups.

As a result of the above observations and for the purpose of aiding the children, as related above, I have provided a device including means to be used by the teachers, and by the children themselves in learning the number processes and number facts; by the use of which device the children can constantly see the process of grouping the numbers, and at the same time the relative position of each number in the number scale.

The above and other objects and advantages are accomplished with my invention as will become apparent from the following description, taken in connection with the accompanying drawing, in which, Fig. 1 is a plan view of one form of my number learning device, with the parts arranged for the study of addition and subtraction problems;

Fig. 2 is a plan view of this device, with the parts arranged for learning and working multiplication and division problems;

Fig. 3 is an inverted plan view, showing the device from the bottom;

Fig. 4 is a longitudinal sectional view, taken on line 4—4 of Fig. 3; and

Fig. 5 is an enlarged cross-sectional view, taken on line 5—5 of Fig. 3.

In the form of my invention illustrated in the drawing my new device and means comprise a frame 15, which is preferably in the form of a plate with turned-over side flanges 16 thereon; and a bar or ruler 17 slidably mounted therein, and preferably arranged to be removable therefrom. This bar is made rigid or semi-rigid, and is therefore constructed of wood, metal, hard rubber composition, or the like; and has a scale of spaced consecutive numbers 18 thereon, substantially in the manner shown in the drawing. The length of this bar and the amount of numbers placed thereon is varied for the different grades of pupils; the device shown, which has numbers one to twelve provided thereon, being well adapted for pupils of the first and second grades. The frame is preferably likewise made rigid or semi-rigid, and of material similar to said bar.

I further provide my device with index means, which preferably comprises closed or endless index bands or collars 20, which fit slidably on bar 17 and have each a lower extending part or ear 21 flattened or arranged to be grasped by the fingers. These bands in conjunction with frame 15 provide the complete index means to be adjusted or set along the bar, for seeing numbers in groups, and thereby learning number facts and working number problems.

The index bands are preferably provided in distinct and vivid colors, to attract and interest the child, and the number of bands varies with the size of the device, being preferably one less than half as many as there are numbers on the bar. In the device illustrated in the drawing five bands are used with twelve numbers on the bar, being sufficient to divide the twelve numbers into six groups of two numbers each, as shown in Fig. 2 of the drawing.

Means is also provided for resting or storing the index bands which are not required in a numbering process or exercise; and this means is preferably provided by making one end 15' of the frame thinner, as by cutting away the turned-over flanges 16 at said end; the length of this end being made so as to accommodate the number of bands on the device, less one, as at least one band is used in any numbering exercise, as indicated in Fig. 1. These bands fit closely around or snugly embrace this end 15' combined with bar 17 thereon, so as to be retained in a position of rest thereby, as best indicated in Fig. 5.

I further provide means, preferably in the form of knobs or lugs 22 on the under side of the bar and near its ends, to prevent the bands from sliding off and being lost, and at least one of these knobs is threaded or removably mounted on the bar. These knobs are also arranged to form supporting means, in conjunction with curved or curled ends 23 on flanges 16, to support the device a short distance above a desk and permit sliding the bands freely thereon, and to permit the device to be readily grasped and raised by the fingers.

*Use of the device*

In using this device for learning number facts, as for grouping numbers, say in adding four and three, one band is placed above number four (see Fig. 1), and the frame is then moved three numbers further upward on the bar, immediately above number seven; thus showing at once to the child that three things or numbers added to four things or numbers equals seven things or numbers, at the same time also bringing clearly before the child's vision and mind that seven is three numbers further upward in the number scale than four; and also keeping in the child's consciousness that there are four numbers in the first group because it sees four separate numbers, and that the three following numbers added thereto make seven numbers together, because it sees the upper number seven as the answer. Likewise in subtracting three from seven, the frame is placed immediately above number seven, and the index band is slid three numbers downward on the bar, thus resting above number four, showing that three from seven leaves four, and at the same time making it clear to the child that number four is three numbers downward below seven in the number scale, etc.

In using my device for learning multiplication and division, say for grouping six twos or to multiply two by six, the spaced numbers on the scaled bar are separated or set-off by the bands into groups of two numbers, as shown in Fig. 2; while the frame is placed immediately above the last or sixth group; thus showing the child that the six twos are twelve, and at the same time showing the gradual increase, step by step, by twos in this process, and also teaching the child to learn counting by twos, automatically and simultaneously along with this multiplication process, with the use of my device. Likewise in division, as when twelve is to be divided into groups of two numbers each, or to divide twelve by two, the frame is set above twelve and the bands are moved downward on the bar and distributed along the numbers thereon, by setting-off these numbers in groups of twos, as indicated in Fig. 2; thus readily showing that there are six groups of twos in twelve, or that twelve divided by two equals six.

This device greatly interests and attracts the children, and they are taking eagerly to the same, and are learning their number processes and number facts with a live interest and with pleasure, and considerably more rapidly than without the device and under the ordinary method used in the schools. This device thus proves to be a great aid to the children in their early school years in learning their number facts and working their problems rapidly and accurately, and finally automatically, and in learning the same with pleasure instead of going through the old time drudgery system of learning their numbers and number facts and problems.

What I claim as my invention and desire to secure by Letters Patent is:

1. A device comprising a member with spaced numbers thereon, a frame movable over said member, and index means adjustable on said member and placeable between said spaced numbers, to cooperate with said frame on said member for indicating numbering results and to be used in learning number facts.

2. A number-learning device comprising a bar with spaced numbers thereon, a frame movable over said bar to cover the numbers or uncover them, index means adjustably placeable on said bar between said spaced numbers, to cooperate with said frame for indicating numbering results, and means for storing the index means which are not in use.

3. A number-learning device comprising a bar with spaced consecutive numbers thereon, a frame movable over said bar, being adapted to cover numbers thereon, and index bands adjustably placeable on said bar between said spaced numbers and cooperating with said frame to show numbering results and also show the relative position of a number in the number scale.

4. A number-learning device comprising a frame with a thin end, a bar with spaced numbers thereon being slidable in said frame, and bands snugly fitting around said thin end and the bar to be stored when not in use and being adapted to be moved between said numbers and in cooperation with said frame to indicate results for learning number facts.

5. A number-learning device comprising a frame, a bar with spaced numbers thereon being slidable in said frame, and closed bands adjustably movable between said spaced numbers for indicating numbering results in cooperation with said frame, said bands having ears for engagement by the fingers and fitting snugly on the ruler and end of the frame.

6. A number-learning device comprising a frame including a plate with turned-over side flanges, which are cut away at one end, a ruler with consecutive spaced numbers slidably mounted between said flanges, and index bands slidable on the ruler and snugly fitting around it and said end of the frame with cut-away flanges.

7. A number-learning device comprising a frame, a bar with spaced numbers thereon being slidable in said frame, index bands adjustably movable on said bar between said spaced numbers, and projecting means on said bar for preventing loss of said bands therefrom.

8. A number-learning device comprising a frame having bottom flanges with curved portions forming projections, a bar with spaced numbers thereon movable between said flanges, elements surrounding said bar and movable between said numbers, and means projecting underneath said bar to prevent removal of said elements and to cooperate with said projecting flange portions for supporting the device on a desk and permit free sliding of the elements along said bar.

9. A number-learning device comprising a frame with bottom flanges, a bar with spaced numbers thereon slidable between said flanges and arranged to have said numbers covered or exposed by moving said frame on said bar, bands adjustably placeable on said bar between said numbers, and knobs underneath said bar to prevent loss of the bands from the bar and to cooperate with means on said flanges for supporting the device on a desk, one of said knobs being removable to permit applying and replacing the bands on the bar.

10. A number-learning device comprising a frame including a plate having turned-over flanges at its sides which are cut-away at one end and curved over at the opposite end to provide supporting projections, a numbered bar slidable between said flanges, index elements slidable on said bar and adapted to be stored on said end with cut-away flanges, and means projecting from said bar to cooperate with said curved flange ends for supporting the device on a desk.

11. A number-learning device comprising a frame including a plate having turned-over flanges at its sides which are cut-away at one end and curved over at the opposite end providing projections, a bar with consecutive spaced numbers on its upper face which are covered or exposed by sliding said frame on said bar, index bands slidable on said bar to be placed between said numbers for working number exercises and fitting snugly around said end with cut-away flanges and the bar, and members projecting underneath said bar to cooperate with said curved flange ends for supporting the device on a desk and to prevent loss of said bands from the bar.

12. A device for grouping and learning numbers, comprising a bar adapted to be supported in the hand or to be placed on a desk and having a scale of numbers thereon, and means movable along said member and selectively placeable with respect to said numbers for arranging said numbers in several groups, for teaching number facts to the young pupils in grammar schools.

13. A device for grouping numbers in teaching number facts, comprising a bar arranged to be supported in the hand and having a scale of successive numbers thereon, and a plurality of means mounted on and movable along said bar, being selectively placeable between the numbers for arranging said numbers in certain groups to indicate numbering results, in teaching number facts.

14. A device for grouping numbers in teaching number facts, comprising a bar adapted to be supported in the hand and having a scale of spaced successive numbers thereon, and a plurality of means slidable along said bar and selectively placeable thereon with respect to said numbers, said means including elements placeable between said numbers, also means cooperating with said elements on said bar, for arranging said numbers in several groups to indicate numbering results, in teaching number facts.

In testimony whereof I have signed my name to this specification.

ELIZABETH JANNESON.